United States Patent
Kondo et al.

[11] 3,931,095
[45] Jan. 6, 1976

[54] FIRE RETARDANT THERMOSETTING RESIN COMPOSITION

[75] Inventors: Renichi Kondo, Tokyo; Koji Nakagawa, Toyama; Makoto Fukuda, Kanagawa; Ikuji Kishi; Tateki Ohtsuki, both of Tokyo, all of Japan

[73] Assignees: Nippon Kayaku K.K.; Denki Kagaku Kogyo Kabushiki Kaisha, both of Tokyo, Japan

[22] Filed: June 28, 1974

[21] Appl. No.: 484,016

[30] Foreign Application Priority Data
June 28, 1973  Japan.................. 48-72261

[52] U.S. Cl............ 260/38; 106/15 FP; 260/37 EP; 260/37 SB; 260/39 R; 260/40 R; 260/42.29; 260/45.7 R; 260/DIG. 24
[51] Int. Cl.².............................................. C08K 3/22
[58] Field of Search.... 260/45.7 R, DIG. 24, 37 EP, 260/37 SB, 38, 40 R, 39 R, 42.29; 106/15 FP; 423/600

[56] References Cited
UNITED STATES PATENTS

| | | | |
|---|---|---|---|
| 1,853,406 | 4/1932 | Corothers et al................... | 423/600 |
| 1,932,889 | 10/1933 | Groff............................... | 260/45.7 R |
| 2,242,258 | 5/1941 | Noll................................. | 423/600 X |
| 2,452,041 | 10/1948 | Elmore............................. | 423/600 |
| 3,733,283 | 5/1973 | Duggins....................... | 260/DIG. 24 |

*Primary Examiner*—Donald E. Czaja
*Assistant Examiner*—S. M. Person
*Attorney, Agent, or Firm*—Sughrue, Rothwell, Mion, & Zinn

[57] ABSTRACT

A fire retardant thermosetting resin composition containing tricalcium aluminate hexahydrate as a filler.

8 Claims, No Drawings

FIRE RETARDANT THERMOSETTING RESIN COMPOSITION

BACKGROUND OF THE INVENTION

1. Field of the Invention

This invention relates to a fire retardant thermosetting resin composition containing tricalcium aluminate hexahydrate as a filler which renders the thermosetting resin composition fire retardant.

2. Description of the Prior Art

It is extremely important to render resins used in construction materials fire retardant from the viewpoint of fire prevention and protection of human life, and such fire retardant resins have also been greatly needed in the fields pf packing materials, furniture, toys, electric utensils and transport vehicles. Many prior art studies and inventions concerning such fire retardant resins have been made, but recently improvements therein have been earnestly needed.

It is known that the addition of antimony trioxide is effective for rendering plastics or rubber fire retardant, and antimony trioxide has often been used for this purpose by incorporation with halogenated resins together with clay. However, the use of antimony trioxide has not been satisfactory because of the high cost and toxicity thereof, and in addition, sufficient fire retardancy has not been obtained. In order to overcome these defects, inorganic fillers containing water of crystallization have been recently utilized, which dehydrate in the vicinity of the decomposition temperature of plastics to control temperature elevation and to accelerate carbonization.

Research has clarified the compatibility of aluminum hydroxide with plastic materials, and C-331 and Hydral 710 (trade names of the Allied Chemical Corporation have been used for this purpose as has been reported by W. J. Connolly and A. M. Thornten, 20Th SPI Sec. 11B(1965). Other used aluminum hydroxides include Higilite (trade name) which is sold commercially by Showa Denko K.K. in Japan. Particles of this aluminum hydroxide are shaped in hexagonal plate form, they contain 35% by weight of water of crystallization, and the dehydration temperature thereof is about 200° to 300°C.

The following citations describe some of the representative related prior art inventions: Japanese Patent Publication No. 263/70 discloses the use of a mixture of aluminum hydroxide and an organic halide, Japanese Patent Publication No. 3962/68 teaches the addition of an inorganic filler containing chemically bound water to an ester containing polymer, and Japanese Patent Publication No. 10535/72 also teaches the addition of an inorganic filler to an epoxy resin. In addition for the purpose of improving the tracking resistance of insulators magnesium hydroxide has been added to thermosetting resins (Japanese Patent Publication No. 16236/63), and lithium hydroxide has been added to vinyl chloride (Japanese Patent Publication No. 25766/67). Japanese Patent Publication No. 22577/71 discloses the incorporation of an adsorbent containing adsorbed water in thermoplastic high molecular weight substances thereby to impart self fire extinguishability thereto, which, however, is questionable in view of the fact that the composition explodes during treatment thereof.

The effectiveness of zinc borate, $2ZnO.3B_2O_3.3.5-H_2O$, for rendering halogenated polyesters and vinyl chloride fire resistant is disclosed in Japanese Patent Publication No. 13149/71 and in W. G. Woods and J. G. Bower, 25th SPI Sec. 9B (1970). The dehydration temperature of the zinc compound is suitably 250°C, but the water content thereof is relatively small (15% or less), and in addition, this compound is very expensive.

On the other hand, it is known that about 50 to 60% by weight of water can be dispersed in unsaturated polyesters in the form of a water-in-oil dispersion, and this is effective for rendering this polymer fire retardant. However, this technique is defective in that the polymer gradually drys and contracts, and therefore, it is particularly difficult to utilize this polymer for external construction members from the viewpoint of the poor water-proof character thereof. For the purpose of stabilizing the water content in such a polymer, another method is suggested wherein calcined gypsum, calcium sulfoaluminate, tricalcium aluminate and gypsum, or calcium sulfoaluminate and Portland cement is (are) added, in addition to water, to form hydrates as disclosed in Japanese Patent Publication Nos. 11808/71, 10807/71, 22723/71 and 22726/71. In this method, the reaction product is gypsum dihydrate or ettringite $(3CaO.Al_2O_3.33CaSO_4.32H_2O)$, and these products are alkaline. Accordingly, some products exist in this method in that the alkaline substances inhibit the hardening of resins and in that dehydration tends to occur due to heat of polymerization and hydration.

A method has been recently developed in which calcium sulfite which is obtained in desulfurization of exhaust fumes is combined with thermoplastic resins such as polyethylene as disclosed in Japanese Patent Publication No. 38333/71. Particles of calcium sulfite are nearly spherical, and they have the advantage that (1) many particles can be combined with these resins and (2) the dehydration temperature thereof is relatively high. On the other hand, however, the water content thereof is small, and thus it is difficult to attain resins which have been rendered sufficiently fire retardant in character. Rather, resins with calcium sulfite can be burned to a moderate extent.

As described above, various attempts have been made for the purpose of rendering plastics fire retardant, particularly thermosetting resin compositions, but additional improvements in fire retardant resins have been recently needed. In view of this need, systematic studies and investigations have been made on fire retardant resins and the present invention has been thus discovered. As a result of research the following facts have been found: Addition of a large amount of fire retardant fillers decreases the needed amount of resin, which is in many cases economically advantageous. However, it is necessary to select fillers whose particles are nearly spherical so that the shapability and mechanical properties of compositions are not be degraded. In addition, preferred fillers contain bound water which are dehydrated when heated to the vicinity of the decomposition temperature of resins thereby to control temperature increase, and further, the generated water vapor should cut off air to prevent flaming and to accelerate carbonization. The present invention is one in which this preferred phenomenon is achieved, and after systematic investigation of various kinds of inorganic fillers of hydroxides, salt hydrates, aluminate hydrates, silicate hydrates and carbonates, and it has been found that a thermosetting resin composition containing tricalcium aluminate hexahydrate 3CaO.Al- $_2O_3.6H_2O$ (hereinafter referred to as $C_3AH_6$) is fire retardant.

Salt hydrates include $Na_2SO_4.10H_2O$ which contain an extremely large amount of bound water. This hydrate, however, is defective in that the dehydration temperature thereof is low and therefore easily dehydrates during kneading, resulting in difficulty in the manufacture of shaped articles, or otherwise, also easily dehydrates during use, resulting in a degradation of the weatherproof property of the resins. In addition, this hydrate has a high solubility, which also deteriorates the water-proof property of the resins.

Calcium aluminate hydrates and calcium sulfoaluminate hydrates have analogous defects. Of the calcium aluminate hydrates, $CaO.Al_2O_3.10H_2O$ is relatively preferred, and the dehydration temperature thereof is about 190° to 300°C, which is quite desirable. However, this hydrate tends to change to $C_3AH_6$ over the course of a long period of time. Of the calcium sulfoaluminate hydrates, $3CaO.Al_2O.CaSO_4.18H_2O$ loses a half of the bound water therein at 100°C, and $3CaO.Al_2O_3.3CaSO_4.32H_2O$ loses two thirds of the bound water therein at 100°C. Since $3CaO.Al_2O_3.3CaSO_4.32H_2O$ is needle-shaped, a large amount of these needles is difficult to combine with resins.

On the other hand, some carbonates have bound water therein whose decomposition heat absorption is large, but they have high decomposition completion temperature and most of them can not be very efficiently used to render resins fire retardant. For example, dehydration of $MgCO_3.3H_2O$ occurs at about 30° to 250°C and decarboxylation thereof at about 400° to 500°C. Thus, this carbonate moderately decomposes over a broad temperature range.

SUMMARY OF THE INVENTION

Accordingly, this invention provides a fire retardant thermosetting resin composition which comprises essentially a thermosetting resin compound and tricalcium aluminate hexahydrate crystals in which the proportion of the crystals is 10 to 90% by weight based on the total weight of the crystals and the resin compound.

DETAILED DESCRIPTION OF THE INVENTION

Tricalcium aluminate hexahydrate ($C_3AH_6$) used in the present invention belongs to an isomeritic system, and the synthesized crystals thereof are 6-, 8- or 12-hedral, and some are 24- or 68-hedral, being almost nearly spherical. By appropriately changing the conditions in the synthesis of $C_3AH_6$, it is possible to aggregate fine crystals thereof and the appearance of the thus aggregated crystals is nearly spherical. In any event, a large amount of these crystals can be blended in resins, and the $C_3AH_6$ of this invention exceeds aluminum hydroxide in this point. In addition, the use of $C_3AH_6$ is extremely advantageous from a number of standpoints in that a decrease in flexibility is comparatively rare, elasticity is improved, stress concentration also is comparatively rare and strength is improved. The greater part of the bound water in $C_3AH_6$ is released at about 240° to 350°C which is most conducive to rendering resins fire retardant. The amount of bound water in $C_3AH_6$ is 29% by weight, which is nearly equal to aluminum hydroxide and is about twice the amount of bound water in zinc borate. The main raw material of $C_3AH_6$ is lime, and therefore, a greater amount of $C_3AH_6$ can be easily manufactured as compared with aluminum hydroxide and zinc borate, and the use of $C_3AH_6$ is extremely economical as a result.

$C_3AH_6$ and a mixture containing $C_3AH_6$ as one main component can be prepared from various raw materials through various reactions. One means is to select as raw materials a combination of $Ca(OH)_2$ and aluminum hydroxide, and industrial wastes can effectively be utilized for these raw materials, for example, acetylene refuse may be utilized for the $Ca(OH)_2$ and substances recovered from waste solutions in aluminum surface treatment for the aluminum hydroxide. Another means is to calcine raw materials of limestone and bauxite to form tricalcium aluminate, which is then hydrated. Alternatively, hexacalcium dialuminoferrite can be hydrated to form $C_3AH_6$, or alumina cement containing monocalcium aluminates as a mian component can be hydrated in an aqueous solution of lime to obtain $C_3AH_6$. A hydrate obtained by hydrating alumina cement along is converted to $C_3AH_6$ and aluminum hydroxide after several days. In particular, in the case of hydrated polyesters, it is possible to blend alumina cement and the resin and to hydrate the alumina cement simultaneously with polymerization of the polyester resin thereby to form $C_3AH_6$ and aluminum hydroxide. In these cases, a small amount of aluminum hydroxide is intermixed with the $C_3AH_6$, which does not seriously affect the property of the $C_3AH_6$.

The reaction conditions can be appropriately selected in accordance with the desired size, form and purity of the $C_3AH_6$ crystals to be produced, or upon a consideration of productivity. $C_3AH_6$ having an inherent crystal form can be separated from a solution of low alumina concentration where the concentration of lime is less than the saturated concentration and the molar ratio of CaO to $Al_2O_3$ is 4 or more. If the molar rate is 3 or less, hydrate crystals belonging to a hexagonal system are separated. The appearance of $C_3AH_6$ changes with increase of this ratio, and more precisely, the proportion of 24-hedral crystals increases at a molar ratio of about 4 to 7, the proportion of 68-hedral crystals increases at a molar ratio of about 9 to 10, that of the hexahedral crystals at a molar ratio of about 13 to 30 and that of the octahedral crystals at a molar ratio of about 50. When a large amount of $C_3AH_6$ is to be obtained from a solution of high concentration, secondary particles of fine crystal aggregates are formed, which may have nearly spherical appearance under proper conditions, and it is possible to impart proper characters to these particles so that they can be suitably admixed with resins.

Representative examples of thermosetting resins which can be used in the present invention are urea resins, phenol resins, furan resins, amino resins, melamine resins, unsaturated polyester resins, diallylphthalate resins, epoxy resins, polyurethane resins, silicone resins and alkyd resins. Numerous kinds of these thermosetting resins are sold commercially. Any and every thermosetting resin can be used in the present invention so long as the resin cures at a temperature below about 200°C, preferably below 150°C, in the presence of absence of a hardener, a curing agent and/or a curing promotor, to form an insoluble and non-fusible solid, and the resin does not react with $C_3AH_6$ under the curing conditions.

Of the thermosetting resins which can be used in the present invention especially advantageous resins are unsaturated polyester resins comprising a mixture of unsaturated polyester compounds materially containing residues of unsaturated polycarboxylic acids such as maleic acid, fumaric acid, itaconic acid, tetrahydrophthalic acid and/or endomethylenetetrahydrophthalic acid, and residues of polyhydric alcohols such as ethylene glycol, propylene glycol, diethylene glycol, dipropylene glycol, neopentyl glycol, trimethylpentanediol, and/or 1,1-isopropylidene-bis-(p-phenyleneoxy)-di-2-propanol, and optionally residues of saturated polycarboxylic acids such as phthalic acid, isophthalic acid, adipic acid, hexachloroendomethylenetetrahydrophthalic acid and/or tetrabromophthalic acid, and vinyl monomers such as styrene, vinyltoluene, methyl methacrylate, triallylcyanurate, diallylphthalate and/or diallylphthalate prepolymer; and epoxy resins such as those containing at least two ethoxyline groups in the molecule which are obtained by reaction of one or more compounds selected from the group consisting of bisphenol A, dihydroxydiphenylmethane, a novolak type phenol-formaldehyde resin, polyethylene oxide and glycerin with epichlorohydrin, as well as vinyl-cyclohexenedioxide, dicyclopentadienedioxide and/or 3,4-epoxy-6-methylcyclohexylmethyl-3',-4'-epoxy-6'-methylcyclohexane carbonate.

Thermosetting resin compounds of the present invention can contain, in addition to the above-mentioned resins, coloring agents, plasticizers, stabilizers, lubricants, hardeners, curing promotors, curing agents, polymerization initiators, condensation initiators, fire retardants, thickening agents, anti-oxidants, polymerization inhibitors, anti-aging agents, releasing agents, blowing agents, surfactants, solvents (active and inactive), reinforcing materials and organic and inorganic fillers in addition to the $C_3AH_6$. In particular, incorporation of fire retardants other than $C_3AH_6$, such as antimony trioxide, zinc borate and fire retardants of organic halides and organic phosphorus compounds is effective.

Selection of resin and other additives in the resin mixtures and determination of the proportion of the respective components therein can easily be effected by those skilled in the art through routine experimentation in accordance with the use of the compositions of the present invention.

The resin mixture of the present invention in the uncured state must retain a sufficient fluidity capable of being shaped at a temperature below 200°C, preferably below 150°C, after the $C_3AH_6$ is added.

The composition of the present invention can be prepared by admixing the above described uncured resin and $C_3AH_6$ and optionally any other additives which are to be added to the resin mixture in any desired order at a temperature below about 200°C, preferably 150°C, until the resulting mixture becomes uniform.

The proportion of $C_3AH_6$ crystals to be incorporated in the resin mixture is suitably about 10 to 90%, preferably 30 to 70%, by weight based on the total amount of the resin mixture. The particle size of the $C_3AH_6$ crystals to be used in the present invention is not of particular concern and can vary widely. In any way, when the $C_3AH_6$ crystals are prepared using conventional techniques, almost all of the cyrstals obtained have particle sizes falling within the range of about 0.5 to 50 $\mu$, and at the same time, it has been confirmed that the use of the $C_3AH_6$ crystals having particle sizes within this range is extremely preferable to achieve the objects of the present invention.

The uncured thermosetting resin compositions of the present invention can be shaped and cured using any known means such as pressing, casting and various kinds of filament reinforced molding techniques to be carried out in combination with glass fibers, for example, hand lay up molding, spray up molding, transfer molding, sheet molding, filament winding, pultrusion, as well as spraying, dipping, rolling, extrusion, injection, rotational and centrifugal molding, by curing at a temperature below about 200°C, preferably below 150°C, under proper curing conditions.

Fire retardant thermosetting resin compositions of the present invention include both cured and uncured compositions as described above.

The compositions of the present invention have sufficient fluidity in the uncured state and display excellent fire retardant characteristic after being cured.

The compositions of the present invention, after being shaped and cured, can be used in various fields such as furniture, construction members, transport utensiles, domestic articles, industrial utensils, containers, packing materials, electric utensils, conduits, panels, ducts, poles and the like.

The present invention is explained in greater detail in the following Example. Unless otherwise indicated, all parts, percents, ratios and the like are by weight.

PREPARATION OF $C_3AH_6$ 3 moles of $Ca(OH)_2$ were put in a flask filled with about 3 liters of distilled water, and 2 moles of $Al(OH)_3$ were gradually added thereto while the suspension was heated at 95°C or more, and the suspension was stirred and reacted for 4 hours. After completion of the reaction, the precipitates were filtered out and dried by heating at about 100°C using a hot air stream. X-ray diffraction analysis confirmed the presence of only $C_3AH_6$ and the weight reduction thereof was measured with a thermobalance is 28.4% which corresponded to the amount of bound water of $C_3AH_6$. The heat absorption in the differential thermal analysis of the sample appeared once on the temperature range of 239° to 363°C. Observation with a scanning type electron microscope disclosed the particles were relatively nearly spherical, that fine particles were closely aggregated and that the surface appearance was scaly. Based on photo-extinction method analysis, the particles were observed to be of various sizes of a diameter of 25 $\mu$ or less exist in a broad range and the average particle size diameter to be 7.5 $\mu$.

EXAMPLE 1

100 parts of an unsaturated polyester resin (Polylite 8010, a trademark produced by Dai-Nippon Ink & Chemicals, Inc.), 1 part of benzoyl peroxide 50% paste and 50 parts of the $C_3AH_6$ crystals prepared in the above were kneaded in a polyethylene beaker (capacity: 1 liter) at room temperature until the crystals were uniformly dispersed. Next, 1 part of a 20% styrene solution of dimethylaniline was added thereto and the mixture fully stirred. Then the resulting composition was immediately poured into three cast iron molds having a casting space of 120 mm × 10 mm × 10 mm. The fluidity of the composition was good and easily filled into the molds. After allowing the mixture in the mold to stand at room temperature for 1 hour, the cured moldings were removed and then post-cured in an oven at 70°C for 10 hours. Thus, three homogeneous white samples were obtained.

EXAMPLE 2

The same process as described in Example 1 was repeated, with the exception that 100 parts of the $C_3AH_6$ crystals were used, and three homogeneous white samples were obtained. The uncured composition had a good fluidity and easily filled into the molds when poured thereinto.

EXAMPLE 3

The same process as described in Example 1 was repeated, except that 200 parts of the $C_3AH_6$ crystals were used, and three homogeneous samples were obtained. The fluidity of the uncured composition was somewhat poorer when poured into the molds but the composition easily filled into the molds.

EXAMPLE 4

100 parts of water were added dropwise to 200 parts of a water fillable unsaturated polyester (Kayaresin WHC 0-55, a trademark, produced by Nippon Kayaku K.K.) while fully stirring, to prepare a water-in-oil resin emulsion. 200 parts of $C_3AH_6$ crystals were added thereto and the mixture was kneaded. Then 1.6 parts of hardener (KB, a trademark of a 50% paste of benzoyl peroxide, produced by Nippon Kayaku K.K.) were further added thereto. The resulting composition was poured into three molds the same as those of Example 1, left at room temperature for 1 hour and cured. The cured moldings were removed and then post-cured in an oven at 70°C for 3 hours. Thus, three homogeneous samples were obtained.

EXAMPLE 5

100 parts of an epoxy resin (Epikote 828, a trademark of Shell Chemical Corporation), 50 parts of hardener (Eponate B-002, a trademark produced by Ajinomoto Co., Inc.) and 150 parts of $C_3AH_6$ crystals were kneaded in a kneader for 10 minutes and then poured into three molds the same as those of Example 1. The fluidity of the mixture was good. The molds containing the mixture were left in an oven at 60°C for 5 hours to cure the contents in the mold. Then the cured moldings were removed, heated at 100°C for 12 hours and then cooled to obtain three homogeneous samples.

COMPARATIVE EXAMPLE A

The process of Example 2 was repeated, except that 100 parts of aluminum hydroxide crystalline powders were used in place of the $C_3AH_6$ crystals. The uncured composition was poor in fluidity, and when the composition was placed in the molds, the composition had to be pressed into the corners of the molds with a spoon. The surfaces of the samples obtained were somewhat rough.

COMPARATIVE EXAMPLE B

The process of Example 2 was repeated, except that 100 parts of ettringite crystals were used in place of the $C_3AH_6$ crystals. In this case, the kneading of the unsaturated polyester resin and the ettringite crystals was extremely difficult, and a mass mixture which was not fluid was obtained. This mixture was pressed into three molds the same as those of Example 1 under pressure, and cured and post-cured analogously to Example 2. Blisters and cracks occurred in the resulting moldings, and normal samples could not be obtained.

COMPARATIVE EXAMPLE C

The process of Example 5 was repeated, except that 150 parts of calcium sulfite crystals were used in place of the $C_3AH_6$ crystals. Three homogeneous samples were obtained.

COMPARATIVE EXAMPLE D

The process of Example 4 was repeated, except that 200 parts of calcium carbonate were used in place of the $C_3AH_6$ crystals. Three homogeneous samples were obtained.

A combination test in accordance with JISK-6911-1962 was carried out on the samples obtained in the above Examples 1 to 5 and Comparative Examples A, C and D, and the results obtained are shown in the following Table. The data in the Table are the averaged data obtained for the three samples in each Example.

TABLE

| No. | Proportion (by weight) of $C_3AH_6$ in the Composition (%) | Time (sec) of Burning Continued 30 Seconds after Ignition | Combustibility Time (sec) of Burning Continued after Ignition Carried out 30 Seconds after the First Fire Extinguishing | Comments |
| --- | --- | --- | --- | --- |
| Example 1 | 33 | 352 | 622 | Self fire-extinguishing |
| Example 2 | 50 | 151 | 306 | Fire Retardant |
| Example 3 | 67 | 0 | 12 | Fire Retardant |
| Example 4 | 40 | 82 | 149 | Fire Retardant |
| Example 5 | 50 | 92 | 256 | Fire Retardant |
| Comparative Example A | 50 | 138 | 325 | Fire Retardant |
| Comparative Example C | 50 | Burnt Out | | Combustible |
| Comparative Example D | 40 | Burnt Out | | Combustible |

It is obvious from the Examples and the data in the above Table that the compositions of the present invention of various kinds of thermosetting resins and $C_3AH_6$ crystals exceed other compositions of thermosetting resins and similar inorganic fillers both, in the shapability of the compositions and in the fire retardant character of the cured moldings.

While the invention has been described in detail and with reference to specific embodiments thereof, it will be apparent to one skilled in the art that various changes and modifications can be made therein without departing from the spirit and scope thereof.

What is claimed is:

1. A fire retardant thermosetting resin composition consisting essentially of a thermosetting resin and tricalcium aluminate hexahydrate crystals, wherein the proportion of the tricalcium aluminate hexahydrate crystals is about 10 to 90% by weight based on the total weight of the tricalcium aluminate hexahydrate crystals and the resin, and wherein said tricalcium aluminate hexahydrate crystals have a particle size ranging from about 0.5 to 50μ.

2. The fire retardant thermosetting resin composition as claimed in claim 1, wherein the proportion of the tricalcium aluminium hexahydrate crystals is 30 to 70% by weight.

3. The fire retardant thermosetting resin composition as claimed in claim 1, wherein said thermosetting resin comprises a urea resin, a phenol resin, a furan resin, an amino resin, a melamine resin, an unsaturated polyester resin, a diallyphthalate resin, an epoxy resin, a polyurethane resin, a silicone resin, an alkyd resin or a mixture thereof.

4. The fire retardant thermosetting resin composition as claimed in claim 1, wherein said thermosetting resin is an unsaturated polyester resin.

5. The fire retardant thermosetting resin composition as claimed in claim 1, wherein said thermosetting resin is an epoxy resin.

6. The fire retardant thermosetting resin composition as claimed in claim 1, wherein said thermosetting resin comprises an uncured thermosetting resin.

7. The fire retardant thermosetting resin composition as claimed in claim 1, wherein said thermosetting resin comprises a cured thermosetting resin.

8. A thermosetting resin article comprising a shaped and cured molding of the composition as claimed in claim 6.

* * * * *